United States Patent
Weeren et al.

(10) Patent No.: US 6,795,535 B1
(45) Date of Patent: Sep. 21, 2004

(54) USING CONCURRENTLY OPERATING ROUTINES IN TELEPHONY APPLICATIONS

(75) Inventors: Eric Weeren, Plano, TX (US); Jim Campbell, Plano, TX (US); Mike Melvin, Richardson, TX (US)

(73) Assignee: Intervoice Limited Partnership, Reno, NV (US)

( * ) Notice: Subject to any disclaimer, the term of this patent is extended or adjusted under 35 U.S.C. 154(b) by 218 days.

(21) Appl. No.: 09/704,310

(22) Filed: Nov. 1, 2000

(Under 37 CFR 1.47)

(51) Int. Cl.⁷ .............................................. H04M 11/00
(52) U.S. Cl. ................................ 379/88.18; 379/88.17; 379/88.22; 379/201.02; 379/219; 379/220.01; 379/221.08
(58) Field of Search ........................... 379/67.1, 70, 72, 379/76, 85, 88.01–88.06, 88.17, 88.18, 88.22, 201.01, 201.02, 202.01, 207.11, 219, 220.01, 221.08, 221.09, 221.11

(56) References Cited

U.S. PATENT DOCUMENTS

| | | | | |
|---|---|---|---|---|
| 5,469,500 A | | 11/1995 | Satter et al. ................. 379/201 |
| 5,479,495 A | * | 12/1995 | Blumhardt ................... 379/207 |
| 5,572,581 A | | 11/1996 | Sattar et al. ................. 379/201 |
| 5,583,920 A | * | 12/1996 | Wheeler, Jr. ................. 379/88 |
| 5,644,631 A | | 7/1997 | Sattar et al. ................. 379/201 |
| 5,757,899 A | * | 5/1998 | Boulware et al. ........... 379/196 |
| 5,822,404 A | | 10/1998 | Cave ............................ 379/67 |
| 5,825,862 A | * | 10/1998 | Voit et al. .................... 379/142 |
| 5,841,854 A | * | 11/1998 | Schumacher et al. ....... 379/265 |
| 5,844,896 A | * | 12/1998 | Marks et al. ................ 370/385 |
| 6,026,156 A | * | 2/2000 | Epler et al. .................. 379/215 |
| 6,041,109 A | * | 3/2000 | Cardy et al. ................. 379/201 |
| 6,269,155 B1 | * | 7/2001 | Dennert ....................... 379/112 |
| 6,463,141 B1 | * | 10/2002 | Tuunanen et al. ..... 379/201.05 |
| 6,614,784 B1 | * | 9/2003 | Glitho et al. ................ 370/352 |
| 6,614,896 B1 | * | 9/2003 | Rao ........................ 379/209.01 |

* cited by examiner

Primary Examiner—Allan Hoosain
(74) Attorney, Agent, or Firm—Fulbright & Jaworski LLP

(57) ABSTRACT

A telephony application architecture which allows creating programs as a set of nested routines running independently and concurrently on three different control layers. Each layer focuses on only a particular portion of the overall call processing function thus allowing that portion to be written or presented in a substantially linear fashion. This linear presentation greatly reduces the complexity of development and maintenance of the software.

27 Claims, 3 Drawing Sheets

USING CONCURRENTLY OPERATING ROUTINES IN TELEPHONY APPLICATIONS

TECHNICAL FIELD

This invention relates generally to the field of call processing and more particularly to providing service node/intelligent peripheral (SN/IP) telephony applications.

BACKGROUND

Computer-based telecommunications systems have grown exponentially over the last several years due, in part, to the ever-advancing and increasing availability of high-speed personal computers and low-cost equipment. The delivery and advancement of calling services has followed this trend of overwhelming growth. Because of rapid technological advancements, telephone service providers are now generally able to offer more complex calling services to a wider population and at a lower cost than previously possible. With this rapid advancement of technology and increasing consumer demand, telephone service providers realize the profitable potential to design, develop, and implement more sophisticated calling services.

During the current evolution of telephone network design, the industry developed a design architecture called Advanced Intelligent Network (AIN). AIN allowed calling service programming to finally be removed from the telephone switches. Prior to AIN, because of the complexity of telephone switches, every time a new calling service was developed, the switch vendors typically had to reprogram the switches to perform the service. This process normally delayed the introduction of new services and generally prohibited smaller telephone service providers from introducing their own calling services thereby reducing the possibility for competitive advantage.

AIN architecture generally works by grouping "intelligent" operations into peripheral computer systems, thereby freeing the switches to perform their core functions of call connection and call routing. AIN architecture also generally allows relatively inexpensive computer systems to provide flexible and efficient call processing. Because the intelligent peripheral computer systems are easier to update, reprogram, and maintain than switches, telephone service providers can generally offer a wider variety of calling services.

Calling services are typically delivered by AIN architecture through service control points (SCP). A switch sends a data package to the SCP which then manages the call processing. SCP's usually delegate many of the tasks associated with the data package to intelligent peripherals (IPs). IPs generally provide a number of processing resources such as voice prompting and data collection. The SCP will normally defer a small part of the call processing to an IP, but will regain control immediately after the IP completes the task. In this prior art system model, the IP receives and executes only primitive commands such as Play Message or Collect Digits.

A typical contemporary AIN architecture system includes service nodes (SN). SNs are usually stand-alone platforms which independently deliver calling services. An SN is typically connected directly to a switch and is dedicated to deliver a particular calling service such as voice mail. After receiving a call, the switch directly routes it to the SN which then processes the call without much direction from the switch or SCP. SNs also may use IPs to provide primitive resources for call processing. Communication systems or calling service applications which use SNs and IPs together are commonly referred to as SN/IP applications.

A recent technological advance to the AIN architecture derives from a family of patents issued to Sattar et al., U.S. Pat. Nos. 5,469,500, 5,572,581, and 5,644,631. Sattar advanced the AIN architecture by establishing more coupling routines between SNs and IPs. The Sattar IP now typically performs more of the decision-making tasks previously handled by the SN. The SN is then left to perform the general call processing and the more complex decision-making tasks. In the context of calling service processing, this generally allows the SN/IP application to lessen fragmentation of the call flow. Call flow refers to the actual call connection between the user and the calling service and the control thereof.

The prior art in SN/IP applications, both before and after Sattar, uses a central program located on the SN which incorporates the call flow control, data access control, and asynchronous event handler. Data access control refers to the function of obtaining data from a source other than a user in response to a user input or call signal such as automatic number identification (ANI) or dialed number identification service (DNIS). The level of data access required depends on the particular calling service being provided. In a voice mail service, the data required would typically consist of a list of valid voice mailbox addresses to check against the user's entry, a list of the user's password or personal identification number (PIN) to check against the user's entry, and the actual message(s) stored in the mailbox.

The asynchronous event handler refers to the call processing/decision-making functions. When a user initiates a call, the asynchronous event handler generally receives the call "event code" and transfers it to the IP for interfacing with the telephony network. If an SN performs a certain function which requires data, the asynchronous event handler usually receives the "get data" command and then either forwards control to the IP if the data is required from the caller or forwards control to the data access control to get data from another source. When the data returns, an event code is typically transferred back to the asynchronous event handler to determine which piece of call flow to execute next.

FIG. 1 shows a typical SN/IP model of the prior art. The system will typically include multiple SNs 100–103, each of which is dedicated to perform a different function. SNs of the same system will normally not be interconnected unless they are overlapped for redundancy. SNs 100–103 will generally be connected to multiple IPs 104–108 which interface with the telephone lines and, thus, also the voice path of the caller. A single SN 100 may be connected to several IPs 106–108, or may just be connected to one, depending on the system configuration and calling function. SNs 100–103 may also be connected to data access routine 109 to perform any data collection other than from the caller.

In an example of pre-Sattar operation, a caller places a call to check the balance in his/her checking account. SN 100 receives the call and forwards it to IP 108 to set up the interface between the calling service and the caller. Because this SN does balance checking, SN 100 begins call flow and sends the initial instruction, Play Message, to IP 108. When IP 108 plays the message, an event code is generated and control is forwarded back to SN 100. SN 100 stops the call flow and then sends the instruction, Get Account Number, to IP 108. Call flow begins again and the caller is prompted by IP 108 to enter the account number. When IP 108 gets the number entered by the caller, an event code is generated and sent back to SN 100. Call flow stops. SN 100 sends an instruction to the data access routine 109 to return a list of valid account numbers. Data access routine 109 returns the list for SN 100 to check against the entered account number. If the number is valid, SN 100 begins call flow again and sends IP 108 the instruction, Get PIN. The process continues until the service has been completed. With all control processing elements located in the SN, the call flow is fragmented because the application must always stop the call flow to return to the SN to perform a particular task or make a particular decision. This start/stop, back and forth methodology makes control of the call flow much more complicated from the programming aspect.

After Sattar, because IP 108 is now able to handle more complex tasks, SN 100 is able to send a string of commands, thereby increasing the length of call flow segments. When the caller places the call, SN 100 begins call flow and sends IP 108 the instructions, Play Message, Get Account Number, Is Account Number Valid?, Get PIN, Is PIN Valid? Call flow begins. IP 108 plays the message, prompts the caller for the account number and checks that number against an internal database. IP 108 then prompts the user for the PIN and checks that number against another internal database. IP 108 then generates an event code and sends the data back to SN 100. SN 100 stops call flow and then uses data access routine 109 to get the account balance corresponding to the account number. After obtaining the requested account balance information, SN 100 begins the call flow again and prompts IP 108 to play a message containing the account balance. In the Sattar model, the call flow presentation appears more linear than before.

A limitation of the prior art is that the system uses a central program to provide the call flow control, the data access control, and the asynchronous event handling. This centralization creates a complex, non-linear program. The call flow experienced by the caller is fragmented and scattered throughout the system. The Sattar patents help this by allowing larger segments of call flow to be kept together. Specifically, the IP portion of the program logic handles caller events and decisions, such as "Is Account Number Valid?" without intermixing those events and decisions with outgoing data access and asynchronous event handling program logic. However, the need for data access limits the length of the call flow segment that can be delegated to the IP. Each interaction by the caller with the data access control requires the call flow segment to end so the SN can use the caller information to retrieve more data. Only then can the SN reinitiate the next segment of call flow. This fragmentation makes programming and, therefore, maintenance of the system much more complex and expensive.

It would therefore be desirable to have a unified model for SN/IP applications which maintains continuous call flow as much as necessary and, thus, facilitates more linear programming of the system.

SUMMARY OF THE INVENTION

These features are achieved by a system and method for providing SN/IP applications which provide at least three distinct layers of concurrently operating control routines. This unified system comprises a first control layer, located on an SN, having an asynchronous event handler routine; a second control layer, located either on the same SN or a different one, having at least one data access routine; and a third control layer, located on an IP, having a call flow routine, wherein the third control layer is connected to the first and second control layers and wherein the IP provides the SN/IP applications with an interface to a telephony network. The present invention also provides for the asynchronous event handler routine and the call flow routine to operate concurrently.

The present invention produces the desired characteristics through a method for modeling SN/IP applications comprising the steps of implementing an event management function on an SN; implementing at least one data management function on an SN; implementing a call flow management function on an IP, wherein the call flow management function is connected to the event management function and to each of the data management function(s). Operating the event management function and the call flow management function concurrently.

It is an advantage of a preferred embodiment of the present invention to provide SN/IP applications by allowing the creation of programs as a set of nested routines running independently and concurrently on three different control layers. Because each layer focuses only on a particular portion of the overall calling service, that portion may be written or presented in a substantially linear fashion. This linear presentation generally keeps the call flow intact and greatly reduces the complexity of development and maintenance of the software.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
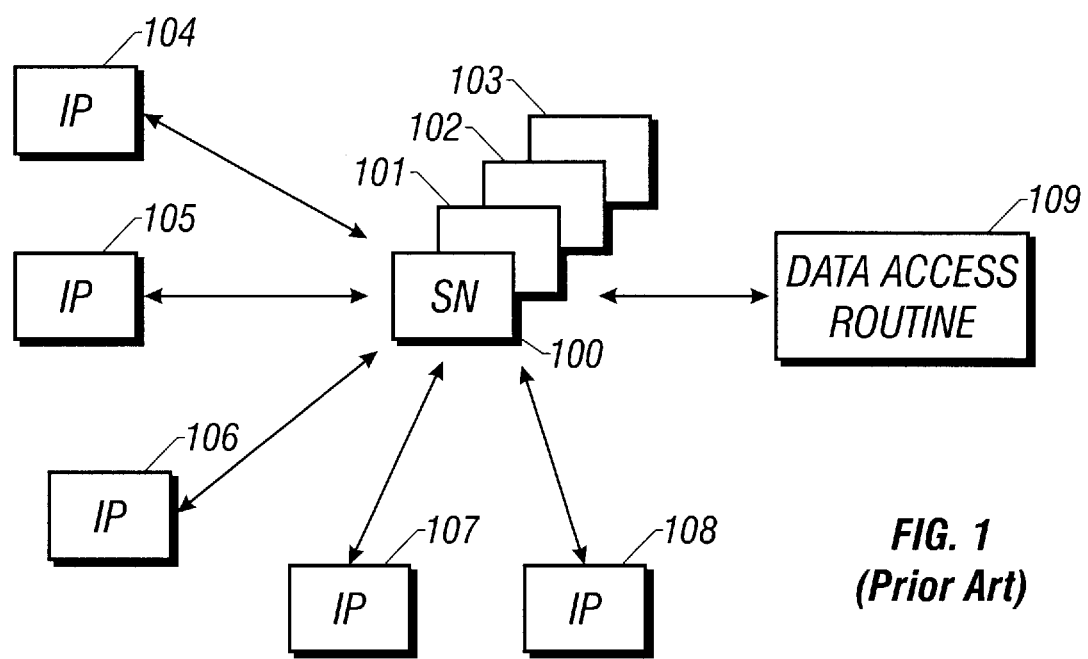
FIG. 1 is a block diagram illustrating a prior art SN/IP application.
Figure 2:
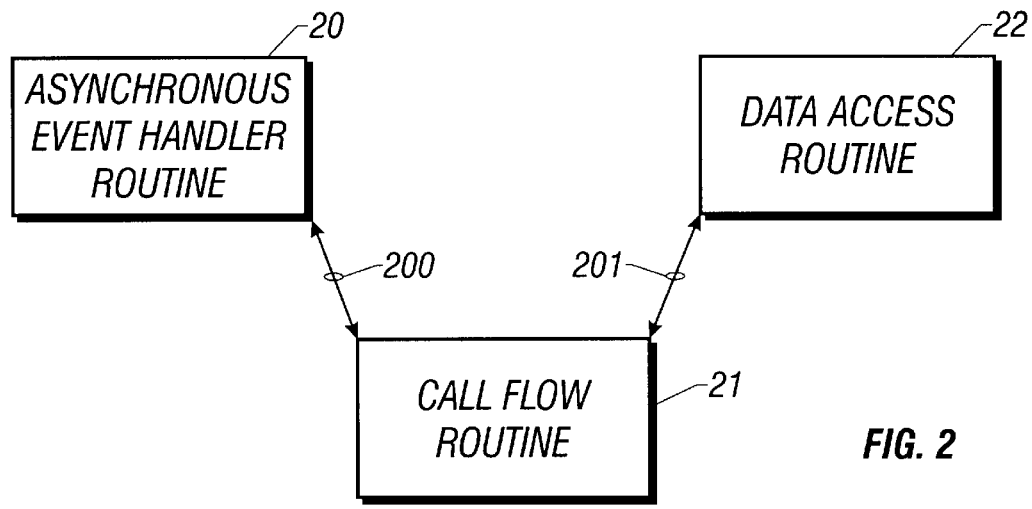
FIG. 2 is a flow diagram illustrating the three layer model of the present invention.

The present invention achieves uninterrupted call flow and facilitates nearly linear programming design by using three separate control layers which operate independently from and concurrently with each other. FIG. 2 shows the relationship between the three control layers. The asynchronous event handler routine 20 forwards an incoming call to the call flow routine 21 through link 200 which initiates the call flow. During the course of the call, call flow routine 21 can forward event handling to the asynchronous event handler routine 20 through link 200 and data requirements to the data access routine 22 through link 201 while keeping the call flow open. As the asynchronous event handler routine 20 and data access routine 22 complete their processing, the results are forwarded to the call flow routine 21 which may act on the resulting information.

Figure 3:
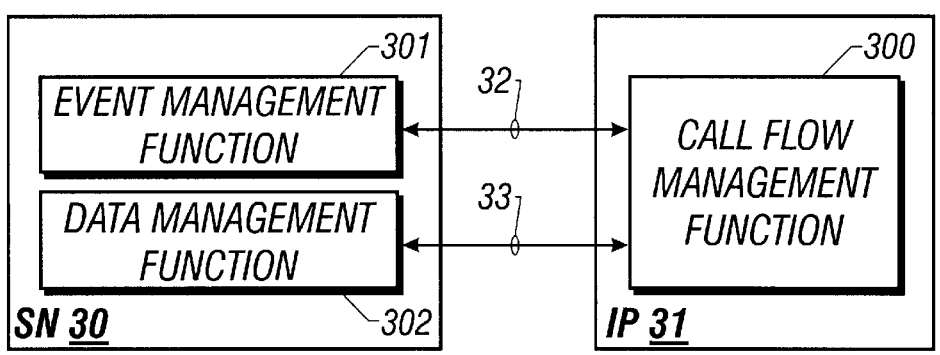
FIG. 3 is a block diagram illustrating a preferred embodiment of the present invention which includes the three control layers implemented on two layers of hardware.

A preferred embodiment of the present invention achieves these advantages by using three separate control layers which operate independently and concurrently on at least two separate layers of hardware. This preferred embodiment is shown in FIG. 3. The event management function 301 and the data management function 302 are both located on SN 30. Call flow management function 300 is located on IP 31. Thus, the three control layers are located on two layers of hardware.

The control layers are connected in such a way so as to allow call flow management function 300 to pass information back and forth between event management function 301 through link 32. Call flow management function 300 is also connected through link 33 to pass information back and forth between data management function 302. Although not shown, in an alternative embodiment of the present invention may provide a link for information communication directly between event management function 301 and data management function 302, if desired. Of course, such information communication may be provided in the embodiment illustrated in FIG. 3 indirectly through call flow management function 300. In the preferred embodiment, all three control layer routines operate concurrently and are, therefore, co-routines. This co-routine relationship allows the call flow to remain open through the duration of the call and also facilitates an uninterrupted presentation to the caller.

Figure 4:
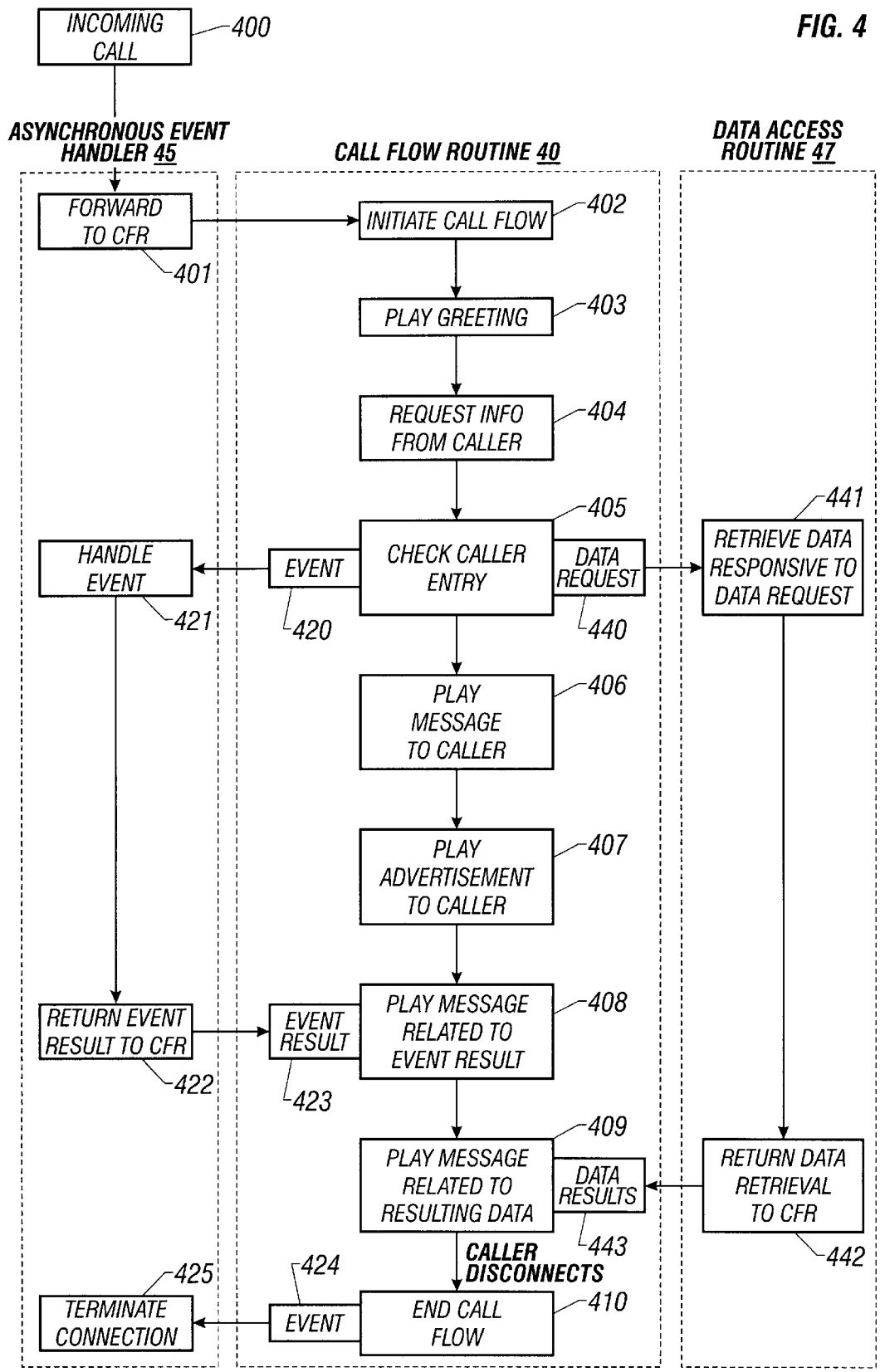
FIG. 4 is a flow diagram illustrating the basic operation of the present invention.

In the general operation of the preferred embodiment of the present invention, as shown in the flow chart of FIG. 4, an incoming call 400 to an SN/IP application is forwarded in step 401 by asynchronous event handler routine 45 to call flow routine 40. This initiates the call flow 402. As events arise during the course of the call, call flow routine 40 passes the event code to asynchronous event handler routine 45, as shown in steps 420 and 424 to process the event. Call flow routine 40 preferably maintains the call flow in steps 405–408 while asynchronous event handler routine 45 concurrently processes the event in steps 421–423. Similarly, when a need for data arises during a call, call flow routine 40 passes a request for data to data access routine 47 as shown in step 440. Data access routine 47 preferably concurrently processes the data request in steps 441–442 and returns the requested data in step 443, while call flow routine 40 maintains the call flow as shown in steps 405–409. During the time in which asynchronous event handler routine 45 is processing the event or in which data access routine 47 is processing the data request, call flow routine 40 may play pre-recorded message asking the caller to wait while the necessary information is accessed, as shown in steps 406 and 407. This process is preferably repeated as required until the caller's business is finished, the caller hangs up, or the caller is disconnected as shown in steps 410, 424, and 425. Thus, the call flow preferably remains open during the entire call as shown in steps 402–410, even while events are processed, steps 420–423, and data is accessed, as in steps 440–443. The constant call flow allows for a more linear program to control the system and provides a more pleasant interface with the caller. Such linear programming is easier to develop and maintain than that required for a random, disjointed call flow.

In a more specific example using the preferred embodiment shown in FIG. 3, consider a telephony application for providing calling card long distance service. A call comes in prompting event management function 301 to transfer the call to call flow management function 300 to launch the call flow. Call flow management function 300 answers the phone, plays a greeting message, prompts the user for the target phone number and the user's PIN or account number. Once the user enters the numbers, call flow management function 300 sends a request to data management function 302 to find out whether the PIN number entered is valid. While data management function 302 retrieves the requested data, call flow management function 300 preferably keeps the call flow open. Call flow management function 300 may play a message, such as an advertisement or new service announcement, to the caller while the data is being retrieved. Call flow management function 300 may also interact with the caller to provide a related service. At some point, data management function 302 returns the requested data and, in this particular example, call flow management function 300 discovers that the PIN corresponds to a stolen calling card. Call flow management function 300 returns an event code to event management function 301 which corresponds to a message that the current call needs to be taken out of the normal call flow. Event management function 301 then preferably launches two new fraud detection applications. One of these applications may be a separate call flow management function on the same or another IP (not shown) designed to keep the caller on the line. The other application preferably initiates a call to a service center with the message that a stolen card is being used. The service center application (not shown) may provide information to the service center to facilitate tracing the call. If the service center is able to trace the call before the caller hangs up, the service center application returns an event code to event management function 301 indicating that the call may now be terminated. With that event code, event management function 301 terminates the connection. In the event that the caller hangs up before the service center can complete a trace, the keep busy routine preferably returns an event code to event management function 301 indicating the caller is no longer on the line. Event management function 301 then preferably sends a message to service center application to inform service center that the caller is no longer there. Event management function 301 then terminates the service center routine.

In this example, the call flow advantageously remains intact because the event management function 301 and the data management function 302 preferably operate concurrently with call flow management function 300. The only break in call flow comes when the caller is transferred to the keep busy call flow management function. This example also illustrates an embodiment wherein SN 30 is preferably connected to more than one call flow management function (call flow management function 300, keep busy management function, and the service center application) and thus possibly more than one IP.

It should be noted that the preferred embodiment of the present invention is not limited to applications directed solely at voice telephone call processing. The preferred embodiment also encompasses video, data, and multimedia processing. An incoming call can be placed by a person on a land-line telephone, a wireless phone, through a low-speed connected computer, a high-speed multimedia computer, or any other device which is capable of connecting over a telecommunications system. Such an embodiment of the present invention may use a data application which conforms to the model disclosed in the above-referenced U.S. patent application, USER DEVICE-INDEPENDENT TRANSACTION MODEL. The invention of this referenced application describes a model in which the user data may be stored in one place and in a generic format. The device-independent transaction model determines the user's access format and then adapts the generic user information into the appropriate format to be viewed or received by the user. This user device-independent format streamlines the data access process while expanding the user access capabilities.

In an alternative embodiment, data management function 302 does not operate concurrently with event management function 301 and call flow management function 300. Although concurrent operation of all three control layers is most desirable and produces a more powerful and flexible result, the basic model can be achieved with only call flow management function 300 and event management function 301 operating concurrently. Another alternative embodiment allows event management function 301 and data management function 302 to be located on separate SNs.

A further alternative contemplates data management function 302 performing a portion of the decision-making or processing of data required for the call. In this alternative, a request for data is forwarded from call flow management function 300 to data management function 302. After the data management function 302 retrieves the requisite data, data management function 302 processes the data and returns a result of the processing for use by call flow management function 300. Therefore, if call flow management function 300 is performing a function which checks the PIN of a caller, call flow management function 300 preferably passes the request to look up the PIN to data management function 302. Data management function 302 looks up the table containing the list of valid PINs, checks the PIN entered by the caller against the list, and then returns a pass/fail response to call flow management function 300.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for implementing telephony applications comprising:
   means for receiving a call with an event management system;
   means for forwarding said call to a call flow manager;
   means for opening a presentation;
   means for forwarding events arising during the course of said call to said management system;
   means for returning event results to said call flow manager;
   means for issuing data requests arising during the course of said call to a data management system;
   means for returning results of said data requests to said call flow manager; and
   means operable by said call flow manager to maintain control over said presentation and to keep said presentation uninterrupted and interactive over the duration of said call.

2. The system of claim 1, wherein said results comprise data retrieved by said data management system.

3. The system of claim 1 further comprising means for processing said results by said data management system.

4. The system of claim 1, wherein said presentation remains uninterrupted for the duration of the call.

5. A unified system for providing service node/intelligent peripheral (SN and IP) applications in at least one multi-processing and multi-programming computer environment, said system comprising:
   a first control layer having an asynchronous event handler routine, said first control layer located on an SN;
   a second control layer having at least one data access routine, said second control layer located on an SN; and
   a third control layer having a call flow routine, said third control layer located on an IP, wherein said third control layer is connected to said first and second control layers and wherein said IP provides said SN and IP applications with an interface to a telephony network, wherein said asynchronous event handler routine and said call flow routine are concurrently operating co-routines operable to maintain an uninterrupted and interactive presentation to a caller.

6. The system of claim 5, wherein said asynchronous event handler routine and said data access routine are located on the same SN.

7. The system of claim 5, wherein said at least one data access routine operates concurrently with said asynchronous event handler routine and said call flow routine.

8. The system of claim 5 wherein said third control layer further comprises an additional plurality of call flow routines, each of said additional plurality of call flow routines located on another one of an additional plurality of IPs.

9. The system of claim 5, wherein a presentation remains uninterrupted for the duration of a call.

10. The system of claim 5, wherein
    a call to said asynchronous event handler routine is forwarded to said call flow routine, wherein a presentation is opened;
    said call flow routine forwards events arising during the course of said call to said asynchronous event handler routine, wherein said call flow routine simultaneously keeps said presentation uninterrupted;
    said asynchronous event handler returns results from event handling responsive to said forwarded events to said call flow routine; and
    said call flow routine forwards data retrieval requests for data requirements arising during the course of said call to said data access routine, wherein said call flow routine simultaneously keeps said presentation uninterrupted.

11. The system of claim 10, wherein said data access routine forwards data responsive to said data retrieval requests back to said call flow routine.

12. The system of claim 10, wherein said data access routine
    retrieves data responsive to said data retrieval requests;
    processes said data; and
    returns results from said processing to said call flow routine.

13. A method for providing service node/intelligent peripheral (SN/IP) applications comprising the steps of:

implementing an asynchronous event handler routine on an SN;

implementing at least one data access routine on an SN;

implementing a call flow routine on an IP, wherein said call flow routine is connected to said asynchronous event handler routine and to each of said at least one data access routine, said IP providing said SN/IP applications with an interface to a telephony network; and operating said asynchronous event handler routine and said call flow routine concurrently, thereby keeping a call flow presentation uninterrupted and interactive.

14. The method of claim 13, wherein said asynchronous event handler routine and said at least one data access routine are on the same SN.

15. The method of claim 13, further comprising the step of:

operating said at least one data access routine concurrently with said asynchronous event handler routine and said call flow routine.

16. The method of claim 13, further comprising the step of implementing an additional plurality of call flow routines each located on one of an additional plurality of IPs wherein each of said additional plurality of call flow routines is connected respectively to said asynchronous event handler routine and to each of said at least one data access routine.

17. A unified system for providing service node/intelligent peripheral (SN/IP) applications in at least one multi-processing and multi-programming computer environment comprising:

means for implementing an asynchronous event handler routine on an SN;

means for implementing at least one data access routine on an SN;

means for implementing a call flow routine on an IP, wherein said call flow routine is connected to said asynchronous event handler routine and to each of said at least one data access routine, said IP providing said SN/IP applications with an interface to a telephony network; and means for operating said asynchronous event handler routine and said call flow routine concurrently, thereby maintaining an uninterrupted and interactive presentation.

18. The system of claim 17, wherein said means for implementing an asynchronous event handler routine and said means for implementing at least one data access routine are on the same SN.

19. The system of claim 17, further comprising:

means for operating said at least one data access routine concurrently with said asynchronous event handler routine and said call flow routine.

20. The system of claim 17, further comprising means for programming an additional plurality of call flow routines each located on one of an additional plurality of IPs, wherein each of said additional plurality of call flow routines is connected respectively to said asynchronous event handler routine and to each of said at least one data access routine.

21. A computer software system having a set of instructions for controlling a general purpose computer in performing telephony applications comprising:

a set of instructions formed into at least three control layers, said layers comprising a first control layer having an event management function, said first control layer located on a computing device;

a second control layer having at least one data management function, said second control layer located on a computing device; and a third control layer having a call flow management function, said third control layer located on a computing device, wherein said third control layer is connected to said first and second control layers, wherein said event management function and said call flow management function operate concurrently, and wherein said call flow management function maintains an uninterrupted and interactive presentation to a caller.

22. The computer software system of claim 21, wherein said event management function and said at least one data management function are located on the same computing device.

23. The computer software system of claim 21, wherein said at least one data management function operates concurrently with said event management function and said call flow management function.

24. The computer software system of claim 21, further comprising an additional plurality of call flow management functions, each located on another one of an additional plurality of computing devices, wherein said additional plurality of call flow management functions are operably connected with said first and second control layers.

25. The method of performing telephony applications comprising the steps of:

forwarding a call to a call flow management function;

opening a call flow presentation;

forwarding events arising during the course of said call to an event management function, wherein said call flow routine simultaneously keeps said call flow presentation open;

returning results from event management function to said call flow management function; and forwarding requests for data arising during the course of said call to a data management function, wherein said call flow management function simultaneously keeps said call flow presentation uninterrupted and interactive.

26. The method of claim 25 further comprising the step of forwarding data responsive to said data requests to said call flow management function.

27. The method of claim 25, further comprising the steps of retrieving data responsive to said data retrieval requests;

processing said data; and returning results from said processing to said call flow management function.

* * * * *